United States Patent
Collins et al.

(10) Patent No.: US 9,251,204 B2
(45) Date of Patent: Feb. 2, 2016

(54) STATIC QUERY OPTIMIZATION

(75) Inventors: Jesse Collins, San Francisco, CA (US);
Jaikumar Bathija, Fremont, CA (US);
John F. O'Brien, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 194 days.

(21) Appl. No.: 13/167,498

(22) Filed: Jun. 23, 2011

(65) Prior Publication Data

US 2011/0320435 A1 Dec. 29, 2011

Related U.S. Application Data

(60) Provisional application No. 61/357,920, filed on Jun. 23, 2010.

(51) Int. Cl.
*G06F 17/30* (2006.01)

(52) U.S. Cl.
CPC .... *G06F 17/30442* (2013.01); *G06F 17/30463* (2013.01); *G06F 17/30536* (2013.01)

(58) Field of Classification Search
CPC .. G06F 17/30699–17/30702; G06F 17/30463; G06F 17/30536
USPC ................................................ 707/718, 719
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,014,661 A * | 1/2000 | Ahlberg et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |

(Continued)

*Primary Examiner* — Brittany N Allen
(74) *Attorney, Agent, or Firm* — Blakely, Sokoloff, Taylor & Zafman

(57) ABSTRACT

In some embodiments, a computer-implemented method for tuning queries for a multi-tenant database system is provided. A processor retrieves actual statistics associated with data stored on one or more servers in the multi-tenant database system. The data may be associated with one or more tenants of the multi-tenant database system. A subset of the actual statistics is selected, wherein the subset of the actual statistics is related to tenants having a data trait targeted for optimization. The processor determines synthetic statistics based on the subset of the actual statistics. An original query is received at the multi-tenant database system, wherein the original query operates upon data associated with a tenant that has the data trait targeted for optimization. The processor determines an optimal query plan based on the original query and synthetic statistics. Finally, the processor executes the original query based on the optimal query plan.

19 Claims, 3 Drawing Sheets

(56) References Cited

U.S. PATENT DOCUMENTS

| | | | |
|---|---|---|---|
| 6,324,568 | B1 | 11/2001 | Diec |
| 6,324,693 | B1 | 11/2001 | Brodersen et al. |
| 6,336,137 | B1 | 1/2002 | Lee et al. |
| D454,139 | S | 3/2002 | Feldcamp |
| 6,363,371 | B1 * | 3/2002 | Chaudhuri ........ G06F 17/30463 |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker et al. |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,340,411 | B2 | 3/2008 | Cook |
| 7,529,728 | B2 * | 5/2009 | Weissman et al. |
| 7,620,655 | B2 | 11/2009 | Larsson et al. |
| 2001/0044791 | A1 | 11/2001 | Richter et al. |
| 2002/0022986 | A1 | 2/2002 | Coker et al. |
| 2002/0029161 | A1 | 3/2002 | Brodersen et al. |
| 2002/0029376 | A1 | 3/2002 | Ambrose et al. |
| 2002/0035577 | A1 | 3/2002 | Brodersen et al. |
| 2002/0042264 | A1 | 4/2002 | Kim |
| 2002/0042843 | A1 | 4/2002 | Diec |
| 2002/0072951 | A1 | 6/2002 | Lee et al. |
| 2002/0082892 | A1 | 6/2002 | Raffel et al. |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0152102 | A1 | 10/2002 | Brodersen et al. |
| 2002/0161734 | A1 | 10/2002 | Stauber et al. |
| 2002/0162090 | A1 | 10/2002 | Parnell et al. |
| 2002/0165742 | A1 | 11/2002 | Robins |
| 2003/0004971 | A1 | 1/2003 | Gong et al. |
| 2003/0018705 | A1 | 1/2003 | Chen et al. |
| 2003/0018830 | A1 | 1/2003 | Chen et al. |
| 2003/0066031 | A1 | 4/2003 | Laane |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker |
| 2003/0088545 | A1 | 5/2003 | Subramaniam et al. |
| 2003/0088579 | A1 * | 5/2003 | Brown et al. ............. 707/104.1 |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec |
| 2003/0189600 | A1 | 10/2003 | Gune et al. |
| 2003/0191743 | A1 | 10/2003 | Brodersen et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan, Jr. et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050041 | A1 * | 3/2005 | Galindo-Legaria et al. ...... 707/4 |
| 2005/0050555 | A1 | 3/2005 | Exley et al. |
| 2005/0091098 | A1 | 4/2005 | Brodersen et al. |
| 2007/0124276 | A1 * | 5/2007 | Weissman et al. ............. 707/2 |
| 2010/0005055 | A1 * | 1/2010 | An .................... G06F 17/30566 707/E17.001 |
| 2012/0173513 | A1 * | 7/2012 | Agrawal ........... G06F 17/30448 707/716 |

* cited by examiner

STATIC QUERY OPTIMIZATION

CROSS-REFERENCE TO RELATED APPLICATION

The present application claims benefit under 35 USC §119 (e) of U.S. provisional Application No. 61/357,920, filed on Jun. 23, 2010, entitled "Methods and Systems for Performing Static Query Optimization in a Multitenant Environment," the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention generally relates to queries, and more particularly to query optimization in an on-demand database and/or application service.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF SUMMARY

The present invention provides systems, apparatus, and methods for tuning queries based on standardized database statistics.

In some embodiments, a computer-implemented method for tuning queries for a multi-tenant database system is provided. A processor retrieves actual statistics associated with data stored on one or more servers in the multi-tenant database system. The data may be associated with one or more tenants of the multi-tenant database system. A subset of the actual statistics is selected, wherein the subset of the actual statistics is related to tenants having a data trait targeted for optimization. The processor determines synthetic statistics based on the subset of the actual statistics. An original query is received at the multi-tenant database system, wherein the original query operates upon data associated with a tenant that has the data trait targeted for optimization. Finally, the processor determines an optimal query plan based on the original query and synthetic statistics.

In some embodiments, a tenant having a data trait targeted for optimization has at least one of the following data traits: (1) complex data, (2) large quantities of data, (3) a high volume of transactions, (4) a high number of transactions involving large file sizes, (5) a high number of resource-intensive transactions, (6) high utilization of a rarely-used column or table, or (7) high utilization of a rarely-used resource.

In some embodiments, determining the optimal query plan comprises computing a plurality of query plans and selecting one of the plurality of query plans as the optimal query plan.

In some embodiments, determining synthetic statistics comprises calculating an average value of a selected statistic in the subset of the actual statistics across one or more tenants having the data trait targeted for optimization. Accordingly, the optimal query plan is based upon the average value in place of a value of the selected statistic.

In some embodiments, determining synthetic statistics comprises determining the total number of tenants having the data trait targeted for optimization. Accordingly, the optimal query plan is based upon the total number of tenants having the data trait targeted for optimization in place of the total number of tenants in the multi-tenant database system.

In some embodiments, determining synthetic statistics comprises setting a pre-determined value for a selected statistic in the subset of the actual statistics. Accordingly, the optimal query plan is based upon the pre-determined value in place of a value of the selected statistic.

In some embodiments, the pre-determined value for the selected statistic is based upon an exemplary tenant having the data trait targeted for optimization. The exemplary tenant has the highest value for the selected statistic.

In some embodiments, the synthetic statistics comprise an average of statistical profiles for one or more tenants having the data trait targeted for optimization. A statistical profile for a tenant comprises one or more actual statistics associated with the tenant.

In some embodiments, the synthetic statistics are uniformly configured across all database instances in the multi-tenant database system.

In some embodiments, a computer-implemented method for executing optimized queries in a multi-tenant database system is provided. An original query is received at one or more servers of the multi-tenant database system, wherein the original query operates upon data associated with a tenant that has a data trait targeted for optimization. A processor retrieves synthetic statistics based on actual statistics associated with one or more tenants of the multi-tenant database system, wherein the one or more tenants have the data trait targeted for optimization. The processor determines an optimal query plan based on the original query and synthetic statistics. Finally, the processor executes the original query based on the optimal query plan.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

The present invention provides systems and methods for query optimization, and more particularly to systems and methods for optimizing queries in an on-demand database and/or application service.

DEFINITIONS

Each database can generally be viewed as a collection of objects, such as a set of logical tables, containing data fitted into predefined categories. A "table," one representation of a data object, is used herein to simplify the conceptual description of objects and custom objects in the present disclosure. It should be understood that "table" and "object" and "entity" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

As used herein, the term multi-tenant database system ("MTS") refers to those systems in which various elements of hardware and software of the database system may be shared between one or more customers. For example, a given application server may simultaneously process requests for a great number of customers (a.k.a. tenant or organization), and a given database table may store rows for a potentially much greater number of customers. In some MTS embodiments, standard entity tables might be provided. For CRM database applications, such standard entities might include tables for relevant data, such as Account, Contact, Lead and Opportunity, each containing pre-defined fields.

As used herein, the term tenant-level statistics is broadly defined as statistical quantities that are kept on a per-tenant basis, although they may mirror the underlying relational database statistics in many ways (for example, in one aspect they track the total number of distinct values for indexed columns).

System Overview

Figure 1:
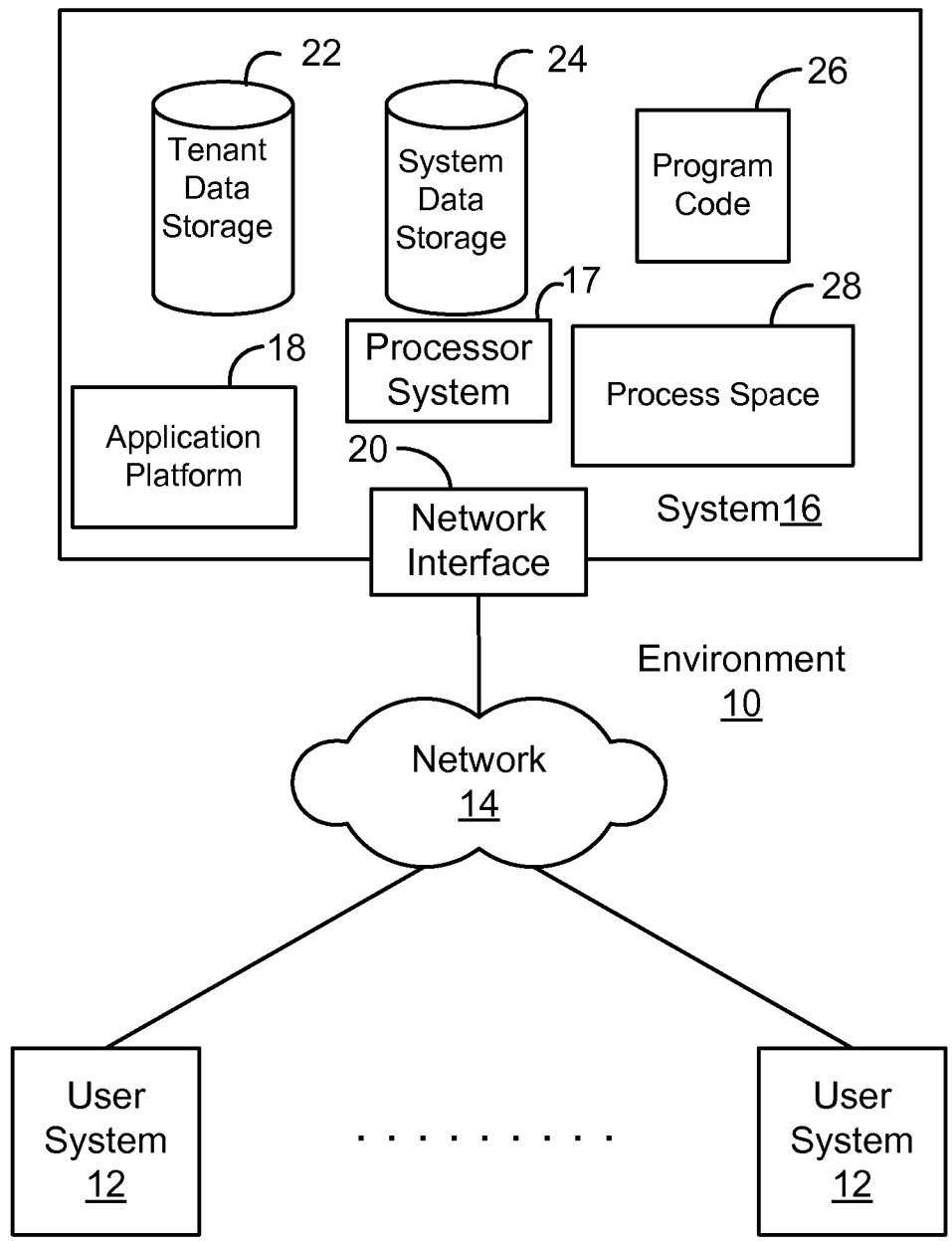
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants (i.e., organizations) stored into tables of a common database image to form a multi-tenant database system (MTS). Accordingly, "on-demand database service 16" and "system 16" will be used interchangeably herein. A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
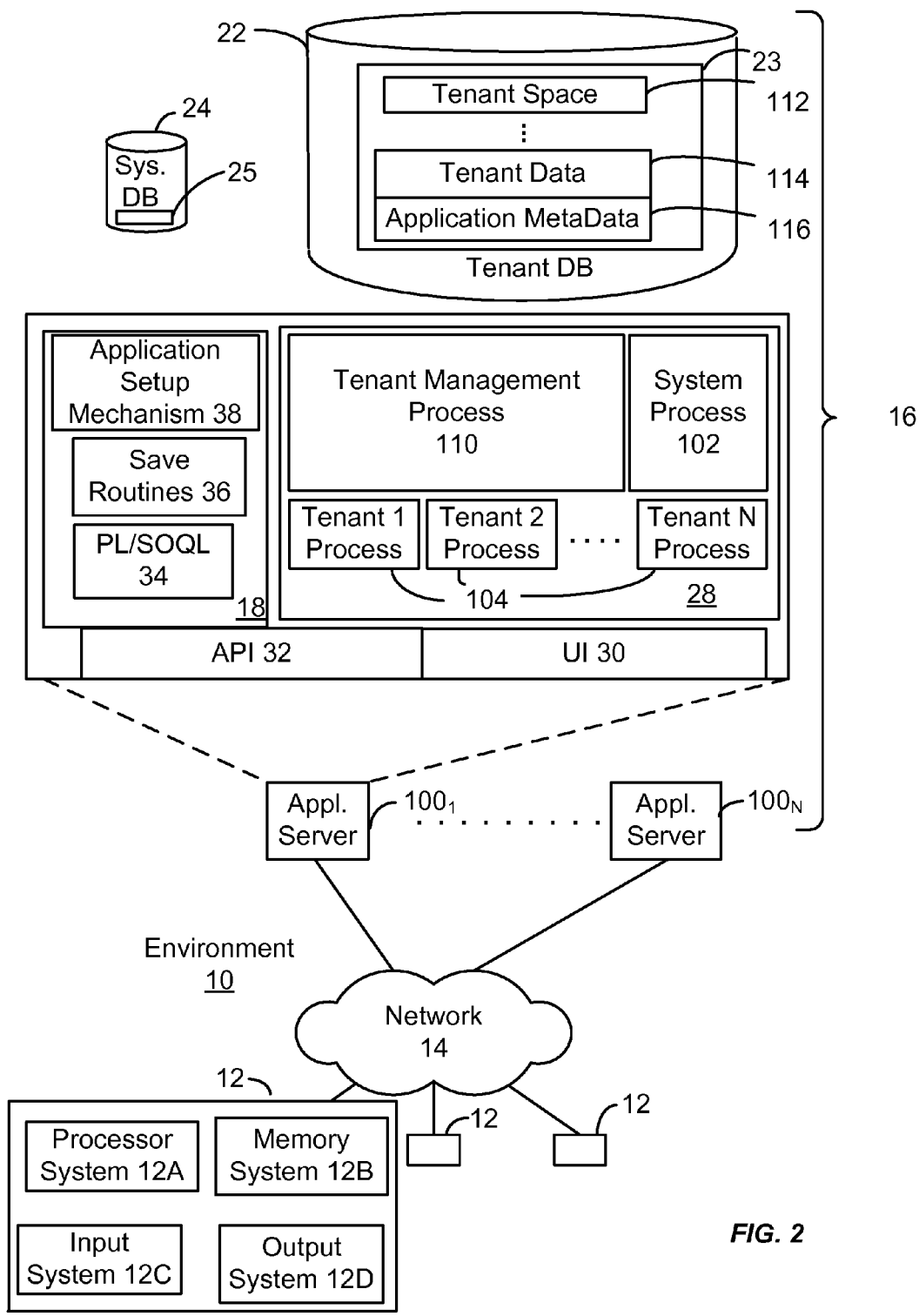
FIG. 2 illustrates a block diagram of an embodiment of elements of FIG. 1 and various possible interconnections between these elements according to an embodiment of the present invention.

FIG. 2 also illustrates environment 10. However, in FIG. 2, elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "Custom Entities and Fields in a Multi-Tenant Database System", by Craig Weissman, filed Apr. 2, 2004, which is hereby incorporated herein by reference, teaches systems and methods for creating custom objects as well as customizing standard objects in a multi-tenant database system.

Query Tuning

In a typical multi-tenant environment, using actual database statistics to generate query plans may lead to poor efficiency because of the schema of a multi-tenant database system—data related to multiple tenants may be stored together in a single table although most data transactions are tenant-specific. Typical database statistics from a global perspective may tend to reflect the average or typical organization (which may be small and have a simple dataset). Unfortunately, actual database statistics often may not accurately characterize certain organizations (typically, the largest ones) with unique data traits (which are typically difficult to optimize), since these are typically few in number. Such unique data traits may include, for example: (1) complex data, (2) large quantities of data, (3) a high volume of transactions, (4) a high number of transactions involving large file sizes, (5) a high number of resource-intensive transactions (a "resource" may include any typical resource associated with a database server, e.g., memory, CPU, network bandwidth, etc.), or (6) a high level of utilization of a resource that is rarely used by most tenants. In addition, certain columns and tables that are accessible to all tenants, but only utilized by a few tenants, may have distributions showing few populated rows or a lot of null values, which tends to throw off query plans for those few tenants that actually utilize those tables/columns. Embodiments are disclosed herein in order to establish synthetic database statistics to be used in facilitating optimized query plans for tenants having a data trait targeted for optimization.

Figure 3:
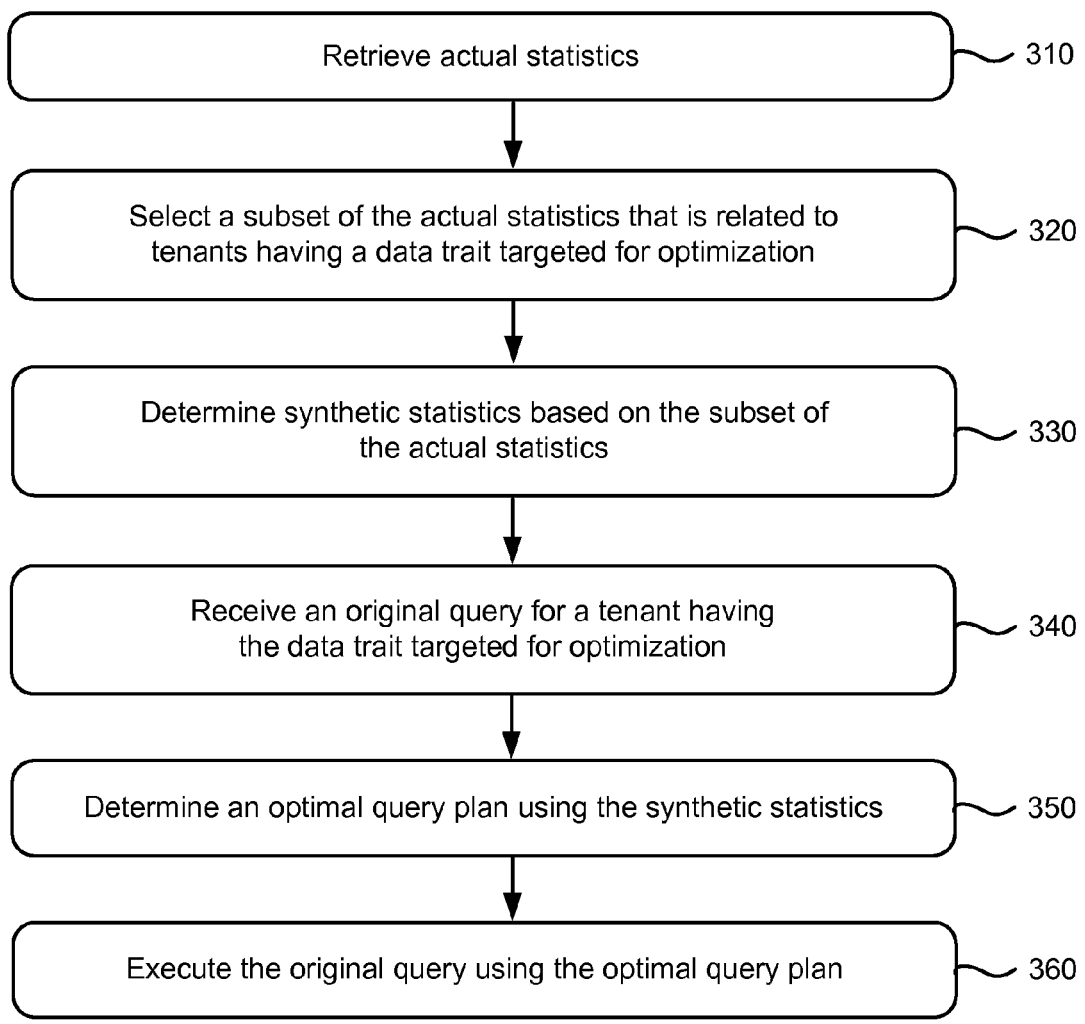
FIG. 3 is a flowchart that illustrates example processes for tuning queries for a multi-tenant database system.

FIG. 3 is a flowchart that illustrates example processes for tuning queries for a multi-tenant database system. In some embodiments, the processes may be performed by one or more servers in the multi-tenant database system; in other embodiments, the processes may be performed by a separate computer, or by a combination of computers outside of and within the multi-tenant database system. The processes shown in FIG. 3 are described below in conjunction with an example use case to illustrate the steps in further detail. The example is provided purely for illustrative purposes and is not intended to limit the scope of the invention in any way. The example is based on a multi-tenant database system where each tenant typically only has access to data associated with their own tenant_id. In the example, a table cases and a table comments in the multi-tenant database system are used in conjunction with application features of the multi-tenant database system that provide for creation and tracking of customer support issues (table cases includes data for each customer-submitted support issue, and table comments includes data for comments entered by customer support representatives regarding each customer-submitted support issue).

Table cases includes columns tenant_id, cases_id, subject, etc. Indexes on table cases include: PKCases (tenant_id, cases_id).

Table comments includes columns tenant_id, comments_id, cases_id, comments_text, created_date, etc. Indexes on table comments include: PKComments (tenant_id, comments_id), FKComments_Cases (tenant_id, cases_id), IEComments_Created (tenant_id, created_date).

In step 310, conventional (actual) statistical data is retrieved. The statistical data may include statistics regarding (1) data stored in the multi-tenant database system, wherein the data is associated with one or more tenants of the multi-tenant database system; (2) transactions involving the multi-tenant database system; or (3) administrative data and/or operations related to the multi-tenant database system. In the example use case, the conventional statistical data indicates: Table cases: 10 million rows. Column tenant_id: 10,000 distinct values.

Table comments: 30 million rows. Column tenant_id: 10,000 distinct values; column cases_id: 10,000,000 distinct values; column created_date: 4,000 distinct values.

In step 320, a subset of the statistical data is selected. This subset of statistical data includes statistical data related to some or all tenants having one or more data traits targeted for optimization. In our example use case, the data trait targeted for optimization is, at a high level, whether or not the tenant utilizes table cases; "utilization" of table cases is indicated when more than one row in table cases exists for any given tenant. Therefore, the subset of statistical data should include all distinct tenant_id foreign keys for which two or more rows exist in table cases.

In step 330, synthetic statistics are calculated based on the subset of statistical data. In some embodiments, the synthetic statistics may be derived from the subset of statistical data by modifying one or more aspects of the data, and then re-calculating the statistical data. In our example use case, calculation of the relevant synthetic statistic (i.e., the number of distinct tenant_id foreign keys in the subset of statistical data related to tenants who utilize features using table cases) indicates that there are actually only 500 distinct tenant_id foreign keys for which two or more rows exist in table cases (a small number when compared to the total number of distinct tenant_id foreign keys in table cases: 10,000).

Table cases: 10 million rows. Column tenant_id: 500 distinct values.

Table comments: 30 million rows. Column tenant_id: 500 distinct values; column cases_id: 10,000,000 distinct values; column created_date: 4,000 distinct values.

In step 340, an original query is received at the multi-tenant database system, wherein the original query accesses data associated with a particular tenant that has at least one of the one or more data traits targeted for optimization. In our example use case, given the following query:
SELECT comments_id, comments_text
FROM comments
WHERE tenant_id=:1
AND cases_id IN (:2, :3, :4)
AND created_date=:5 a conventional query optimization methodology may result in these two query plan options:

Query Plan 1

| OPERATION | OBJECT | ROWS | COST |
|---|---|---|---|
| TABLE ACCESS | COMMENTS | 1 | 4 |
| INDEX RANGE SCAN | IECOMMENTS_CREATED | 1 | 3 |

Query Plan 2

| OPERATION | OBJECT | ROWS | COST |
|---|---|---|---|
| TABLE ACCESS | COMMENTS | 1 | 9 |
| INDEX RANGE SCAN | PKCOMMENTS | 3 | 6 |

The statistics tell the database that on the average, for a given tenant_id and created_date, there are very few rows (it will calculate a value of 1 row—30 million rows/10000 tenants/ 4000 distinct dates). For the average tenant, Query Plan 1 appears to be less costly than Query Plan 2 and may suffice. However, most queries to tables cases and comments will originate from tenants who utilize these tables more fully; these tenants may have many customer support issues submitted in a single day. For these tenants, Query Plan 1 may perform quite poorly if many comments fall into the given date range, since the database would have to look each row up in the table before applying the primary key filter (on tenant_id).

In step 350, an improved query is generated based on the original query and the synthetic statistics. In one embodiment, a synthetic statistic derived from the actual statistic is based upon an analysis of the actual distribution of distinct values for the foreign key. In our example use case, the same optimization methodology, based upon the synthetic statistic instead of the actual statistic, may result in a different set of query plan options:

Query Plan 1

| OPERATION | OBJECT | ROWS | COST |
|---|---|---|---|
| TABLE ACCESS | COMMENTS | 1 | 18 |
| INDEX RANGE SCAN | IECOMMENTS_CREATED | 15 | 3 |

Query Plan 2

| OPERATION | OBJECT | ROWS | COST |
|---|---|---|---|
| TABLE ACCESS | COMMENTS | 1 | 9 |
| INDEX RANGE SCAN | PKCOMMENTS | 3 | 6 |

Incorporation of the synthetic statistic causes the computed cost for the Query Plan 1 (i.e., the IECOMMENTS_CREATED plan) to change significantly, whereas the cost of Query Plan 2 (i.e., the PKCOMMENTS query plan) to remain the same. Since the total usage of the table is dominated by no more than 500 tenants (since the likelihood that any given query on tables cases and/or comments was submitted by one of those 500 tenants), Query Plan 2 is ultimately selected as the more optimal query plan.

In some embodiments, the same table, index, and column statistics are synthetically standardized across all database instances, regardless of the actual differences in data distribution across databases, and no partition-level statistics are set within a database. The reason for this is that it is desirable to have consistent query plans across database instances, in order to minimize management overhead. Furthermore, while the optimum query plan for a query depends on the local data distribution, in a multi-tenant database system, the relevant local data distribution is the distribution for the given organization (i.e., tenant), not the database. The query plan for one organization should not depend on what other customers happen to be on the same database, which is what one would get if statistics were conventionally gathered on each database.

In some embodiments, synthetic statistics are scaled in order to make them representative of the data distributions of the largest organizations in the system, rather than the average organizations. Conventional database statistics would indicate that the typical customer has relatively few rows, or tends to have a null value in one or more columns (because there may be a small number of very large organizations compared to a very large number of small and trial organizations). However, the large organizations produce disproportionately more load than the small organizations, since they have more users running queries and their queries run against much larger data sets. Also, the database will perform far too many large data scans if the statistics indicate that the average organization size is small, since the relative cost of nested loop joins to large scans is higher. Therefore, it is desirable for the system to perform well for the very large organizations. To accomplish this, as in the example use case above, the distinct value counts for certain key columns are set to artificially low values. For example, the database may be told that there are only 1000 distinct tenant_id's in a table when the true number is more like 50,000.

In some embodiments, certain columns tend to have a very small number of distinct values within a typical organization but many distinct values across all organizations. For these columns, the synthetic statistics are set with the number of distinct values for a typical organization. This informs the database that a filter on this column is not very selective (whereas with conventional statistics it would compute that the filter is quite selective.) An example of such a column would be a record_type_id; customers can define record types to classify rows of an entity into different types. A given organization might have on the order of 5 or 10 record types, but the record type ids are distinct across all organizations, so the table might have 50,000 distinct values. If a query filters on record_type_id, it is desirable that the database to compute that that filter will reduce the rowcount by approximately a factor of 5, not 50,000.

In some embodiments, a database administrator or other user of the multi-tenant database system may manually configure the synthetic statistics to more closely tailor database performance in accordance with perceived or anticipated needs.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for tuning queries for a multi-tenant database system, the method comprising:

retrieving actual statistics associated with data stored on one or more servers in the multi-tenant database system, wherein the data is associated with one or more tenants of the multi-tenant database system;

selecting a subset of the actual statistics, wherein the subset of the actual statistics is related to tenants having a data trait targeted for optimization, wherein a tenant having a data trait targeted for optimization has at least one of the following data traits: (1) a high volume of transactions, (2) a high number of transactions involving large file sizes, (3) a high number of resource-intensive transactions, (4) high utilization of a rarely-used column or table, or (5) high utilization of a rarely-used resource;

determining, using one or more processors associated with the one or more servers, synthetic statistics based on the subset of the actual statistics, wherein the synthetic statistics are derived from the subset of actual statistics by modifying one or more aspects of the data based on a subset of the tenants of the multi-tenant database system, the subset of tenants having the data trait targeted for optimization, and then re-calculating statistical data to generate the synthetic statistics;

receiving an original query transmitted to the multi-tenant database system by a user associated with a tenant that has the data trait targeted for optimization, wherein the original query operates upon data associated with the tenant; and determining, using the processor, an optimal query plan based on the original query and the synthetic statistics.

2. The method of claim 1, wherein determining the optimal query plan comprises:

computing, using the one or more processors, a plurality of query plans; and selecting the optimal query plan from the plurality of query plans.

3. The method of claim 1, wherein determining synthetic statistics comprises calculating an average value of a selected statistic in the subset of the actual statistics across one or more tenants having the data trait targeted for optimization; and wherein the optimal query plan is based upon the average value in place of a value of the selected statistic.

4. The method of claim 1, wherein determining synthetic statistics comprises determining the total number of tenants having the data trait targeted for optimization; and wherein the optimal query plan is based upon the total number of tenants having the data trait targeted for optimization in place of the total number of tenants in the multi-tenant database system.

5. The method of claim 1, wherein determining synthetic statistics comprises setting a pre-determined value for a selected statistic in the subset of the actual statistics; and wherein the optimal query plan is based upon the pre-determined value in place of a value of the selected statistic.

6. The method of claim 5, wherein the pre-determined value for the selected statistic is based upon an exemplary tenant having the data trait targeted for optimization, and wherein the exemplary tenant has the highest value for the selected statistic.

7. The method of claim 1, wherein the synthetic statistics comprise an average of statistical profiles for one or more tenants having the data trait targeted for optimization, and wherein a statistical profile for a tenant comprises one or more actual statistics associated with the tenant.

8. A computer-implemented method for executing optimized queries in a multi-tenant database system, the method comprising:

receiving an original query transmitted to one or more servers of the multi-tenant database system, wherein the original query operates upon data associated with a tenant of a plurality of tenants of the multi-tenant database system, wherein the tenant has a data trait targeted for optimization;

retrieving synthetic statistics, wherein the synthetic statistics are based on actual statistics associated with one or more tenants of the multi-tenant database system, and wherein the one or more tenants have the data trait targeted for optimization, wherein a tenant having a data trait targeted for optimization has at least one of the following data traits: (1) a high volume of transactions, (2) a high number of transactions involving large file sizes, (3) a high number of resource-intensive transactions, (4) high utilization of a rarely-used column or table, or (5) high utilization of a rarely-used resource;

determining, using one or more processors associated with the one or more servers, synthetic statistics based on the subset of the actual statistics, wherein the synthetic statistics are derived from the subset of actual statistics by modifying one or more aspects of the data, and then re-calculating statistical data to generate the synthetic statistics based on a subset of the tenants of the multi-tenant database system, the subset of tenants having the data trait targeted for optimization;

executing, using the one or more processors, an optimal query plan based on the synthetic statistics.

9. The method of claim 8, wherein the synthetic statistics are uniformly configured across all database instances in the multi-tenant database system.

10. The method of claim 8, wherein determining the optimal query plan comprises:

computing, using the one or more processors, a plurality of query plans; and selecting the optimal query plan from the plurality of query plans; and wherein executing the original query based on the query plan comprises executing the original query based on the optimal query plan.

11. The method of claim 8, wherein the synthetic statistics comprise an average value of a selected statistic in the subset of the actual statistics across one or more tenants having the data trait targeted for optimization; and wherein the optimal query plan is based upon the average value in place of a value of the selected statistic.

12. The method of claim 8, wherein the synthetic statistics comprise the total number of tenants having the data trait targeted for optimization; and wherein the optimal query plan is based upon the total number of tenants having the data trait targeted for optimization in place of the total number of tenants in the multi-tenant database system.

13. The method of claim 8, wherein the synthetic statistics comprise a pre-determined value for a selected statistic in the subset of the actual statistics; and wherein the optimal query plan is based upon the pre-determined value in place of a value of the selected statistic.

14. The method of claim 13, wherein the pre-determined value for the selected statistic is based upon an exemplary tenant having the data trait targeted for optimization, and wherein the exemplary tenant has the highest value for the selected statistic.

15. The method of claim 13, wherein the pre-determined value for the selected statistic is based upon manually-configured settings.

16. The method of claim 8, wherein the synthetic statistics comprise an average of statistical profiles for one or more tenants having the data trait targeted for optimization, and wherein a statistical profile for a tenant comprises one or more actual statistics associated with the tenant.

17. A non-transitory computer-readable medium containing program code executable by a processor in a computer to tune a query, the program code including instructions to:
retrieve actual statistics associated with data stored on one or more servers in the multi-tenant database system, wherein the data is associated with one or more tenants of the multi-tenant database system;
select a subset of the actual statistics, wherein the subset of the actual statistics is related to tenants having a data trait targeted for optimization, wherein a tenant having a data trait targeted for optimization has at least one of the following data traits: (1) a high volume of transactions, (2) a high number of transactions involving large file sizes, (3) a high number of resource-intensive transactions, (4) high utilization of a rarely-used column or table, or (5) high utilization of a rarely-used resource;
determine, using one or more processors associated with the one or more servers, synthetic statistics based on the subset of the actual statistics, wherein the synthetic statistics are derived from the subset of actual statistics by modifying one or more aspects of the data, and then re-calculating statistical data to generate the synthetic statistics based on a subset of the tenants of the multi-tenant database system, the subset of tenants having the data trait targeted for optimization;
receive an original query transmitted to the multi-tenant database system by a user associated with a tenant that has the data trait targeted for optimization, wherein the original query operates upon data associated with the tenant; and
generate, using the processor, an optimal query plan based on the original query and the synthetic statistics.

18. A system comprising:
one or more processors; and
a memory encoded with instructions to configure the one or more processors to:
retrieve actual statistics associated with data stored on one or more servers in the multi-tenant database system, wherein the data is associated with one or more tenants of the multi-tenant database system;
select a subset of the actual statistics, wherein the subset of the actual statistics is related to tenants having a data trait targeted for optimization, wherein a tenant having a data trait targeted for optimization has at least one of the following data traits: (1) a high volume of transactions, (2) a high number of transactions involving large file sizes, (3) a high number of resource-intensive transactions, (4) high utilization of a rarely-used column or table, or (5) high utilization of a rarely-used resource;
determine, using one or more processors associated with the one or more servers, synthetic statistics based on the subset of the actual statistics, wherein the synthetic statistics are derived from the subset of actual statistics by modifying one or more aspects of the data, and then re-calculating statistical data to generate the synthetic statistics based on a subset of the tenants of the multi-tenant database system, the subset of tenants having the data trait targeted for optimization;
receive an original query transmitted to the multi-tenant database system by a user associated with a tenant that has the data trait targeted for optimization, wherein the original query operates upon data associated with the tenant;
generate, using the processor, an optimal query plan based on the original query and the synthetic statistics; and execute the original query based on the optimal query plan.

19. The system of claim 18, wherein the synthetic statistics are uniformly configured across all database instances in the multi-tenant database system.

* * * * *